United States Patent [19]

Chung et al.

[11] Patent Number: 5,347,613
[45] Date of Patent: Sep. 13, 1994

[54] MOS MULTI-LAYER NEURAL NETWORK INCLUDING A PLURALITY OF HIDDEN LAYERS INTERPOSED BETWEEN SYNAPSE GROUPS FOR PERFORMING PATTERN RECOGNITION

[75] Inventors: Ho-sun Chung; Hyo-jin Han, both of Taegu, Rep. of Korea

[73] Assignee: Samsung Electronics Co., Ltd., Kyunggi-do, Rep. of Korea

[21] Appl. No.: 745,346

[22] Filed: Aug. 15, 1991

[30] Foreign Application Priority Data

Aug. 18, 1990 [KR] Rep. of Korea ............... 90-12915

[51] Int. Cl.⁵ ............................................. G06F 15/18
[52] U.S. Cl. ........................................ 395/24; 395/27; 395/23; 364/DIG. 1; 364/274.9; 364/276.6; 364/271.3
[58] Field of Search .................. 395/800, 20, 21, 23, 395/24, 11, 27, 101; 307/576; 382/14

[56] References Cited

U.S. PATENT DOCUMENTS

| | | | |
|---|---|---|---|
| 5,087,826 | 2/1992 | Holler et al. | 395/24 |
| 5,092,343 | 3/1992 | Spitzer et al. | 364/413.05 |
| 5,095,457 | 3/1992 | Jeong | 364/758 |
| 5,117,235 | 5/1992 | Ho-sun | 341/159 |
| 5,146,542 | 9/1992 | Engeler | 395/24 |
| 5,153,923 | 10/1992 | Matsuba et al. | 395/101 |
| 5,165,010 | 11/1992 | Masuda et al. | 395/27 |
| 5,170,463 | 12/1992 | Fujimoto et al. | 395/11 |
| 5,175,794 | 12/1992 | Tattersall | 395/2 |
| 5,187,680 | 2/1993 | Engeler | 364/807 |
| 5,195,169 | 3/1993 | Kamiya et al. | 395/23 |
| 5,195,171 | 3/1993 | Takatori et al. | 395/24 |
| 5,214,743 | 5/1993 | Asai et al. | 395/11 |
| 5,218,646 | 6/1993 | Sirat et al. | 395/23 |
| 5,220,618 | 6/1993 | Sirat et al. | 395/23 |
| 5,220,641 | 6/1993 | Shima et al. | 395/24 |

Primary Examiner—Alyssa H. Bowler
Assistant Examiner—Mehmet Geckil
Attorney, Agent, or Firm—Cushman, Darby & Cushman

[57] ABSTRACT

Disclosed is a multi-layer neural network and circuit design method. The multi-layer neural network receiving an m-bit input and generating an n-bit output comprises a neuron having a cascaded pair of CMOS inverters and having an output node of the preceding CMOS inverter among the pair of CMOS inverters as its inverted output node and an output node of the succeeding CMOS inverter as its non-inverted output node, an input layer having m neurons to receive the m-bit input, an output layer having n neurons to generate the n-bit output, at least one hidden layer provided with n neurons to transfer the input received from the input layer to every upper hidden layer and the output layer, an input synapse group in a matrix having each predetermined weight value to connect each output of neurons on the input layer to each neuron of the output layer and at least one hidden layer, at least one transfer synapse group in a matrix having each predetermined weight value to connect each output of neurons of the hidden layer to each neuron of every upper hidden layer and the output layer, and a bias synapse group for biasing each input node of neurons of the hidden layers and the output layer.

5 Claims, 5 Drawing Sheets

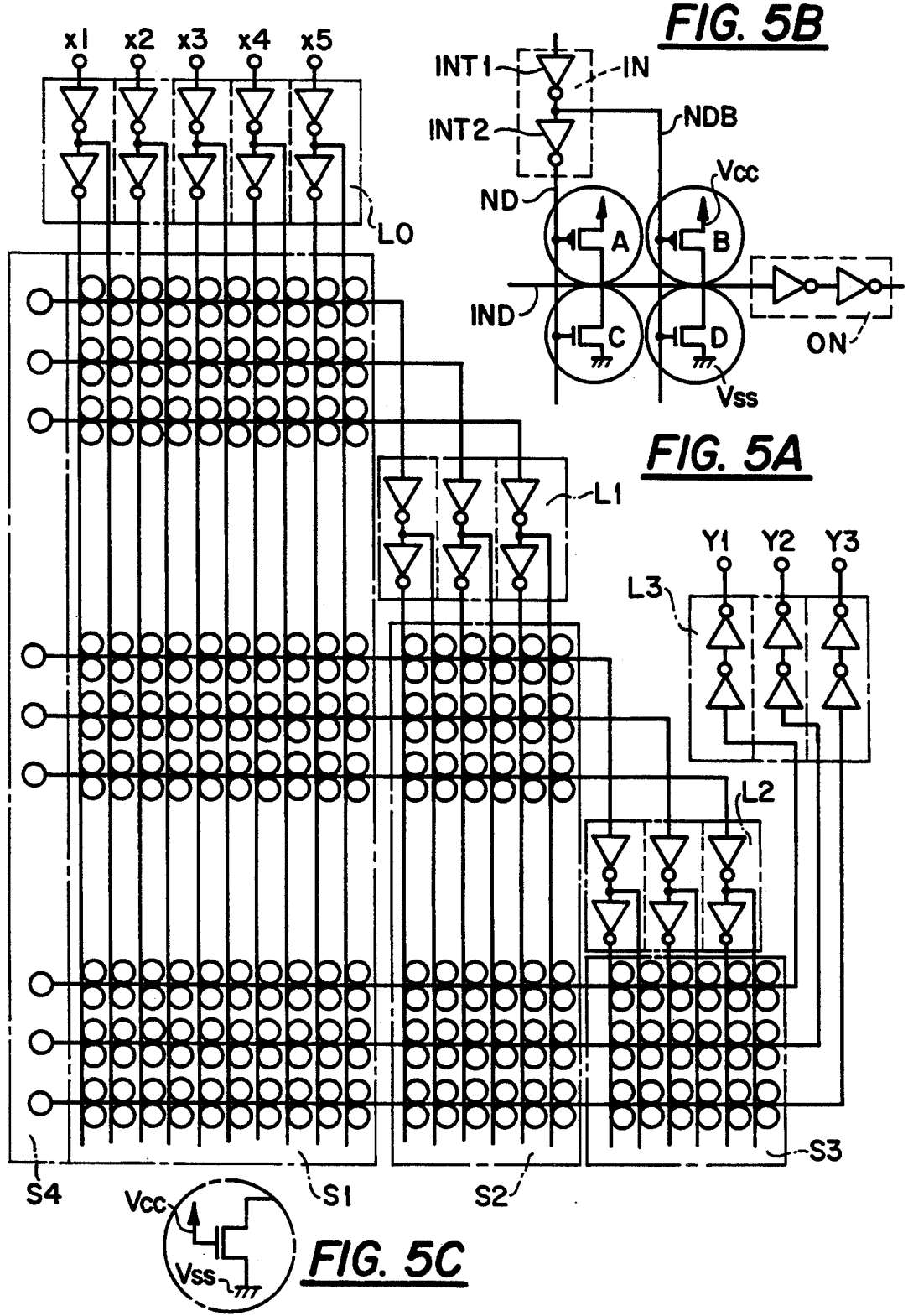

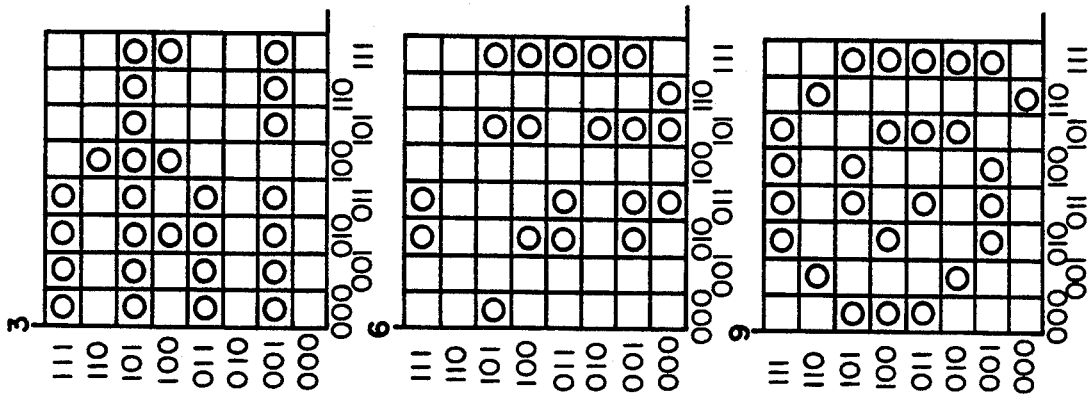
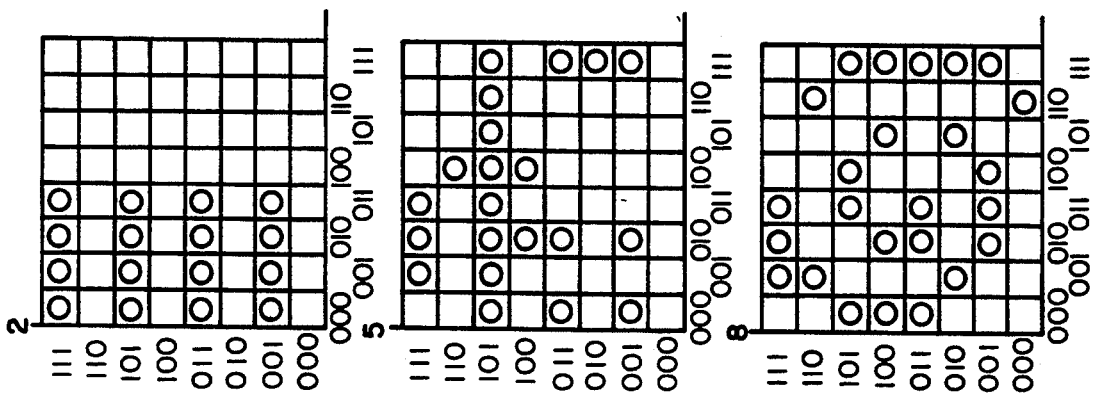
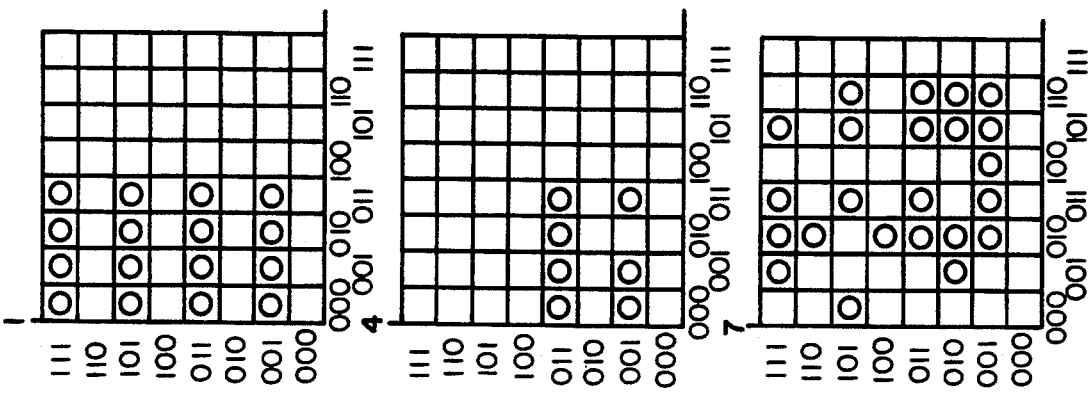

MOS MULTI-LAYER NEURAL NETWORK INCLUDING A PLURALITY OF HIDDEN LAYERS INTERPOSED BETWEEN SYNAPSE GROUPS FOR PERFORMING PATTERN RECOGNITION

BACKGROUND OF THE INVENTION

Field of the Invention

The present invention relates to a MOS multi-layer neural network and its designing method, and more particularly to a multi-layer neural network and the designing method thereof which can easily realize the VLSI circuitry for a multilayer neural network.

Description of the Related Art

Recently, in the pattern recognition field, neural networks which can do large-scale parallel processing in real-time have been introduced. In 1988, Hans P. Graf et al. of Bell laboratories, presented a pattern recognizing neural network wherein amplifiers, having their inputs and outputs interconnected through a resistive connected device in a matrix, constitute synapses and neurons of the neural network, and a pair of switches which switch according to data in a pair of RAM cells, constitute neuron interconnections.

The present inventor has filed numerous applications including: an adder (U.S. patent application Ser. No. 07/473,653), a multiplier (07/473,633), an A/D converter (07/473,631, 07/473,634), a pattern classifier (07/473,464), etc. These related applications disclose a neural network having synapses constructed using PMOS and/or NMOS transistors, and including neurons made from buffers in the form of cascaded pairs of CMOS inverters. The aforementioned neural circuits are based on a one-layer neural network mode and solve only linearly separable problems, but not linearly unseparable problems (non-linear problems). Accordingly, their application is extremely limited. For instance, an XOR circuit cannot be properly modelled by a one-layer neural network. The limitations of one-layer neural networks are overcome by properly designed multi-layer neural networks. It is known that a neural network can learn by a back-propagation algorithm (refer to IEEE ASSP MAGAZINE, pages 4 to 22, April, 1987).

There are more restrictions, however, in the hardware implementation of multi-layer neural networks than in software simulated algorithms in a computer. This is due to the fact that hardware implementation of a multi-layer neural network depends on current VLSI technology. As a result the circuit implementation of connection weight values for neural circuits and non-linear functions is not as readily attainable as with software simulated algorithms. Although real number calculations with floating point operation and also models neural network models requiring increased interconnection capability can be achieved using software, such software implemented operation became difficult with VLSI technology.

SUMMARY OF THE INVENTION

It is an object of the present invention to provide a multi-layer neural network having integer connecting weight values and a step function, to solve the problem of the conventional technique.

It is another object of the present invention to provide a circuit design method of a multi-layer neural network for designing the multilayer neural network according to the new learning rule.

To achieve the object, the multi-layer neural network of the present invention receiving an m-bit input and generating an n-bit output comprises:

a neuron for cascading a pair of CMOS inverters and having an output node of the preceding CMOS inverter among the pair of CMOS inverters as its inverted output node and an output node of the succeeding CMOS inverter as its noninverted output node;

an input layer having m neurons to receive the m-bit input;

an output layer having n neurons to generate the n-bit output;

at least one hidden layer provided with n neurons to transfer the input received from the input layer to every upper hidden layer and the output layer;

an input synapse group on a matrix having each predetermined weight value to connect each output of neurons on the input layer to each neuron of the output layer and at least one hidden layer;

at least one transfer synapse group in a matrix having each predetermined weight value to connect each output of neurons of the hidden layers to each neuron of every hidden layer and the output layer; and a bias synapse group for biasing each input node of neurons of the hidden layers and the output layer.

Here, the input synapse group, the transfer synapse group and the bias synapse group are constructed by PMOS and NMOS transistors.

There is also provided a method for designing the above described multi-layer neural network for receiving an m-bit input and generating an n-bit output, which comprises:

a first step of initializing the connection weight value of the input synapse group;

a second step of setting the m-bit input value and an n-bit desired output value corresponding to the input and output of the input layer and output layer;

a third step of obtaining the sum of the input weight values from the input node of each neuron of the output layer and generating an actual output by a step function;

a fourth step of comparing the actual output value obtained in the third step, with the desired output value set in the second step to calculate the error, and storing the variation of the weight value calculated according to the error value;

a fifth step of terminating the learning if each output value equals its desired output value, or if not, obtaining the sum of the stored variation of the weight value and adding it to each current weight value to obtain a new weight value, after the second step through the fourth step are carried out with respect to $2^m$ input and output pairs;

a sixth step of reducing each weight value by a predetermined ratio, when the sum of the new weight value obtained in the fifth step in the input node of each neuron of the output layer is above a predetermined value; and a seventh step of using the output layer as a hidden layer, incrementing the new output layer, and repeating the process beginning with the second step using the outputs of every lower hidden layer and the original input as new inputs, when the desired result is not obtained after repeating the learning up to the sixth step by the predetermined times of repetitions.

BRIEF DESCRIPTION OF THE DRAWINGS

The above objects and other advantages of the present invention will become more apparent by describing the preferred embodiment of the present invention with reference to the attached drawings, in which:

FIG. 5A is a circuit diagram of an embodiment of the multi-layer neural network according to the present invention;

FIG. 5B and 5C are partial circuit diagrams for explaining the synapse structure of FIG. 5A;

FIG. 6B-J is a spiral pattern diagram for each layer obtained by learning the spiral pattern of FIG. 6A according to the circuit design method of the multi-layer neural network of the present invention.

DETAILED DESCRIPTION OF THE INVENTION

Hereinafter, the present invention will be described with reference to the accompanying drawings.

Figure 1:
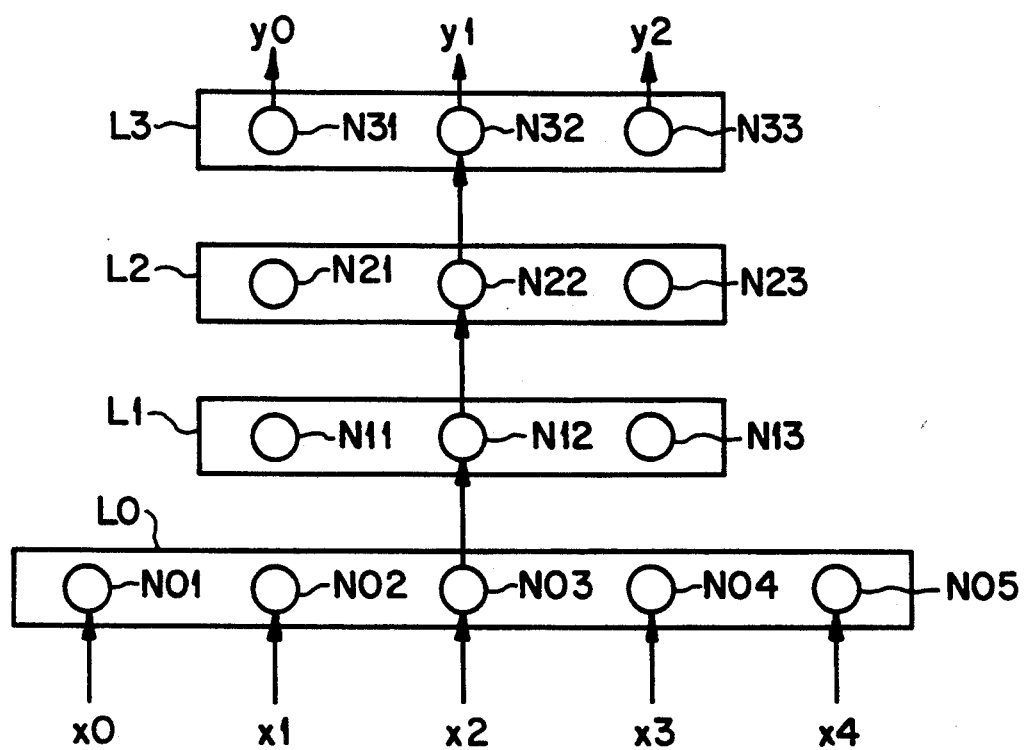
FIG. 1 is a concept diagram of a conventional multi-layer neural network.

FIG. 1 is a concept diagram of a general multi-layer neural network which is a feed forward network having nodes of at least one layer between input and output nodes. These additional layers include hidden units or nodes which are not directly connected to both the input and output nodes. As shown in FIG. 1, the three-layer neural network has two-layer hidden layers L1 and L2 between the input layer L0 and the output layer L3. The input layer L0 has five neuron units or nodes NO1 to NO5 to receive inputs $X_0$ to $X_4$. The hidden layers L1 and L2 each have three neuron units or nodes N11, N12, & N13, and N21, N22, & N23, respectively, while output layer L3 also has three neuron units or nodes N31, N32, and N33 to respectively generate outputs $Y_0$, $Y_1$, and $Y_2$. Here, it should be noted that the number of neuron units of each layer is determined by the number of input and output bits of the circuitry of the system. The neuron units or nodes of each layer are connected with all of the neuron units of its directly preceding lower layer only.

Figure 2:
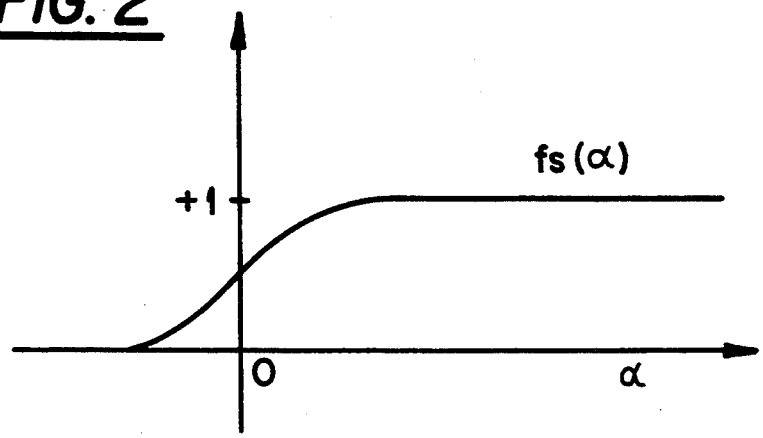
FIG. 2 is a characteristic graphic diagram of a sigmoid function used in the learning of the conventional multilayer neural network.

The conventional multi-layer neural network is learned by the previously known back-propagation training algorithm (BPTA). The BPTA has the graphic characteristic shown in FIG. 2 and uses the sigmoid function represented in the following Eq(I):

$$f(\alpha) = \frac{1}{1 + \exp[-(\alpha - \theta)]} \quad (I)$$

However, since the sigmoid function is an exponential function, the hardware implementation is difficult and complicated.

Also, when a binary input and a step function are used, the convention multi-layer neural network may have just one value with respect to different input values because of the connection structure between layers. As a result, the upper layer input values cannot be discriminated.

Figure 3:
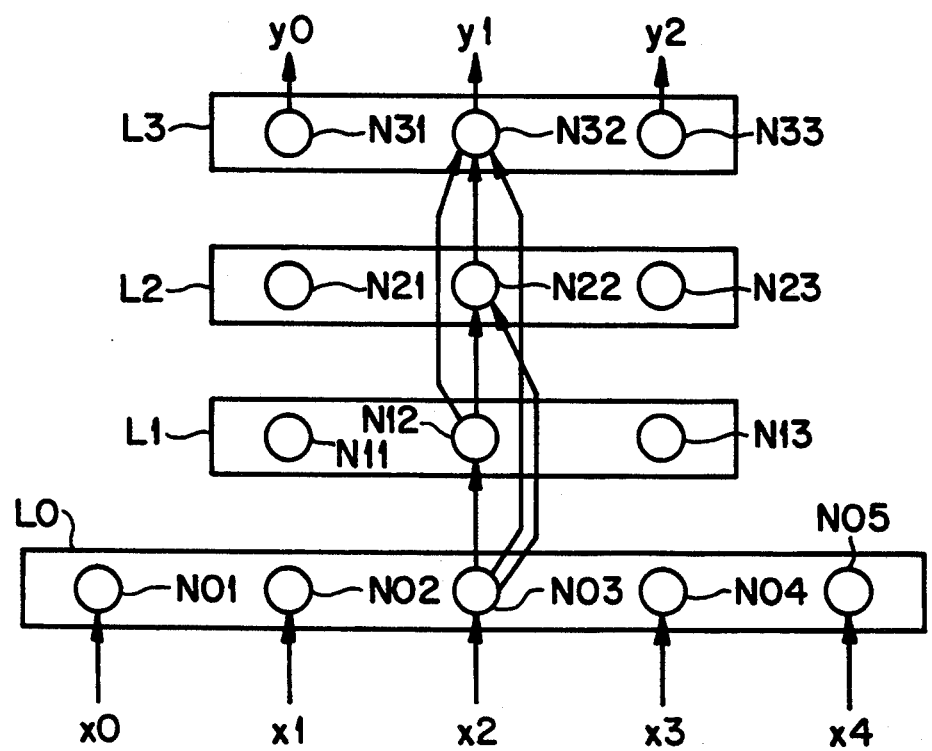
FIG. 3 is a concept diagram of a multi-layer neural network according to the present invention.
Figure 4:
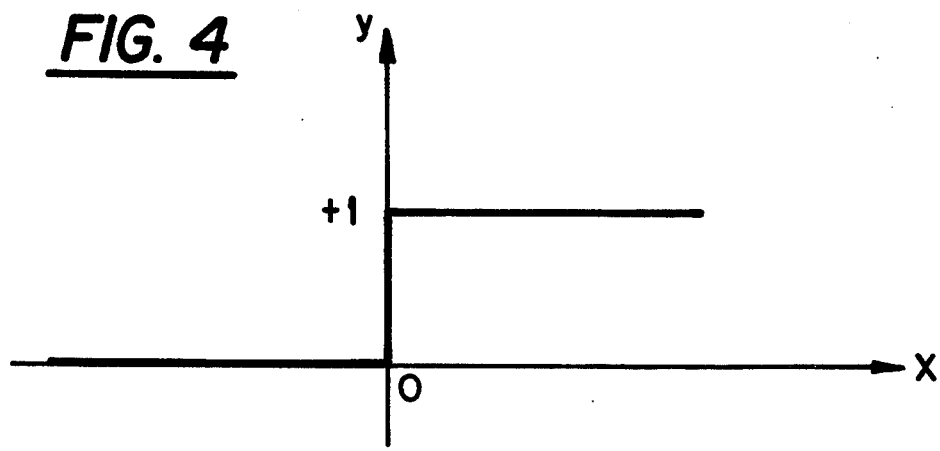
FIG. 4 is a characteristic graphic diagram of a step function used in the learning of the multi-layer neural network according to the present invention.

FIG. 3 is a concept view of a multi-layer neural network according to the present invention. The present multi-layer neural network is different from the multi-layer neural network of FIG. 1 in that the neuron units or nodes of each layer are connected with all neuron units of the immediate input layer as well as those of each lower layer. Since other parts of this constitution is the same as those of FIG. 1, the same reference numerals will be used for corresponding parts. Also, the learning of the multi-layer neural network of the present invention has the graphic characteristic shown in FIG. 4 and uses the step function represented in the following Eq. (II):

$$Y_i = \frac{1}{2} \left[ fh \left( \sum_{i=0}^{N-1} W_i \cdot X_i - \theta \right) + 1 \right] \quad (II)$$

$fh(\Sigma W_i X_i - \theta)$: hard limit non-linear function
$\theta$: threshold value of neuron node
$W_i$: connection weight value with respect to $X_i$  $X_i$: input The circuit of multi-layer neural network according to the present invention is designed by the learning algorithm as follows.

Step 1: All connection weight values between nodes are initialized.

Step 2: A pair of input and desired output are presented to input and output. Here, the inputs are m-bit binary values and the total number of inputs is $2^m$, and the outputs are n-bit binary values and the total number of outputs is $2^n$. Accordingly, identical output values with respect to different inputs can be obtained.

Step 3: The sum of the input weight values at each node is obtained and the actual output is generated by the step function. Here, Eq. (II) is used for the step function.

Step 4: The desired output value at an output node is compared with the actual output value obtained in step 3, thereby calculating an error, and the variation of the weight value according to the error is stored. That is, the error $\delta$ is:

$$\delta = \text{Desired Output} - \text{Actual Output}$$

and the weight value variation $\Delta W$ is $$\Delta W = \delta \times \text{Input}$$

Step 5: After steps 2, 3, and 4 are carried out for each input and output pair, if all the actual output values are equal to the desired output values, the learning ends. If not, the total sum of the weight value variation $\Delta W$ is added to each weight value. That is, the new weight value ($W_T$) is:

$$W_T = W_{T-1} + \Sigma \Delta W$$

where T equals the number of learnings.

Step 6: When the sum of the new weight value $W_T$ with respect to each node's input is above a determined value M, the weight values $W_T$ are reduced at a predetermined rate. That is, the weight value $W_T$ is reduced by the following equation:

$$W_{T'} = W_T \times \frac{M}{\Sigma W_T} \quad \text{(III)}$$

assuming, $\Sigma W > M$ and where $W_T$, is the a weight value obtained after the T learning processes have been conducted.

Step 7: If the preceding steps (from step 2) are repeated a predetermined number of times with a new weight value $W_T$ and without reaching the desired result, the current output layer becomes a hidden layer, the new output layer is incremented, and then the process is repeated (beginning at step 2) using the original input together with the outputs of all the lower hidden layers as a new input to the new output layer.

Hence, learning is performed by one-layer learning. If a desired output value is correctly obtained, learning ends. However, if learning is repeated a predetermined number of times, and the result remains incorrect, then a layer is added. In the incremented new layer, the original input and the incomplete actual outputs of every lower hidden layer are used as new inputs, and the learning is repeated for the following layer. At this time, the output layer for the first learning is changed to act as a hidden layer. That is, in the following layer, the learning is repeated using the same method as the learning of the previous layer, but with more inputs by the number of outputs of every hidden layer. During the learning process, whenever an input is added, the variation in weight value is stored. After all inputs are applied, the sum of variations of the total weight values is added into the weight value, thereby making a new weight value.

Here, the sum of the weight value to be compared with one neuron is above the predetermined value M, Eq. (II) is applied with respect to each weight value to reduce them at a predetermined rate, thereby limiting the sum of the weight values to within the value M.

A multi-layer neuron network designed with respect to specific inputs and outputs through such a learning, is embodied by CMOS inverters, PMOS and NMOS transistors as shown in FIG. 5A and 5C. In FIG. 5A, a three-layer neuron network is shown having a 5-bit input and a 3-bit output. Thus, an input layer L0 has five neurons N01 to N05, and two hidden layers L1 and L2 each have three neurons N11, N12, &N13, and N21, N22, & N23, respectively, similarly, output layer L3 also has neurons N31, N32, and N33. Here, each neuron of every layer is a cascaded connection of a pair of CMOS inverters INT1 and INT2 as shown in FIG. 5B, and is constructed with a buffer where an output node of preceding CMOS inverter INT1 is an inverted output node NDB and the output node of following CMOS inverter INT2 is a non-inverted output node ND. The synapse for connecting each neuron of an input layer and each neuron of an output layer is constructed of PMOS and NMOS transistors by the following method.

If the learning obtains a final connection weight which is positive, and the input neuron IN receives a high logic signal (input bit value=1), the corresponding connection strength in the form of a first supply voltage (e.g., supply voltage Vcc) is connected to the input node IND of the output neuron ON through the PMOS transistor B whose gate is common with the inverted output node NDB, and for negative connection weight values, the connection is to a second supply voltage (e.g., ground or Vss) through NMOS transistor C whose gate is common with the non-inverted output node ND. Conversely, when the input neuron receives a low (input bit value=0) and the connection weight is positive, the connection strength is in the form of supply voltage Vcc connected through PMOS transistor A whose gate is also common to the non-inverted output mode ND, while for negative weights, the connection strength is a ground potential or equals the second supply voltage Vss, and is connected through NMOS transistor D whose gate is tied to the inverted output node NDB.

If the connection weight value is "0", no connections are made, regardless of the logic state of the input bit.

Using this method, an input synapse group S1 and transfer synapse groups S2 and S3 of FIG. 5A are constructed of PMOS and NMOS transistors. Here, each neuron of input layer L0 is connected to each input node of every neuron of the two hidden layers L1 and L2 and output Layer L3, through the aforesaid input synapse group S1 in a matrix. Each neuron of hidden layer L1 is connected to each input node of neurons of every upper hidden layer (L2) and an output layer L3, through the transfer synapse group S2 of the matrix. Similarly, each neuron of hidden layer L2 is connected to each input node of the neurons of output layer L3, through the transfer synapse group S3 in a matrix.

Also, all neuron input nodes of the two hidden layers L1 and L2 and output layer L3 shown in FIG. 5A are biased to the second supply voltage Vss or GND through bias synapse group S4. Since the bias synapse group S4 biases the input node of each neuron to the second supply voltage Vss or GND when the input is not applied and thus biases each neuron output to "0", the bias synapse group S4 is composed of NMOS transistor, wherein the first supply voltage Vcc is supplied to the gate, the drain is connected to input node of each neuron, and the second supply voltage (Vss or GND) is connected to the source. Here, the NMOS transistor for a bias synapse has the geometric aspect ratio (channel width (W)/ channel length (L)) to have a connection strength equivalent to the unit weight value. For instance, when the W/L ratio of NMOS transistor is 2 $\mu$m/2 $\mu$m as a unit weight value, the W/L ratio of the PMOS transistor becomes 5 $\mu$m/2 $\mu$m. This is set considering the mobility ratio of electron to hole, and each weight value is a multiple of the unit weight value; that number being an integer. Thus, the term of "+1" in Eq. (II) is a constant considering the bias synapse value.

The embodiment applying the multi-layer neural network of the present invention as described above to the 2-bit full adder and the spiral pattern recognizing circuit is as follows.

<Embodiment I> A 2-BIT FULL ADDER

A 2-bit full adder has a 5-bit input composed of a 2-bit addend, a 2-bit augend, and an 1-bit carry input, and a 3-bit output.

TABLE 1

| INPUT | | | | | OUTPUT | | |
|---|---|---|---|---|---|---|---|
| $X_4$ | $X_3$ | $X_2$ | $X_1$ | $X_0$ | $Y_3$ | $Y_2$ | $Y_1$ |
| 0 | 0 | 0 | 0 | 0 | 0 | 0 | 0 |
| 0 | 0 | 0 | 0 | 1 | 0 | 0 | 1 |
| 0 | 0 | 0 | 1 | 0 | 0 | 0 | 1 |
| 0 | 0 | 0 | 1 | 1 | 0 | 1 | 0 |
| 0 | 0 | 1 | 0 | 0 | 0 | 1 | 0 |
| 0 | 0 | 1 | 0 | 1 | 0 | 1 | 1 |
| 0 | 0 | 1 | 1 | 0 | 0 | 1 | 1 |
| 0 | 0 | 1 | 1 | 1 | 1 | 0 | 0 |
| 0 | 1 | 0 | 0 | 0 | 0 | 0 | 1 |

TABLE 1-continued

| INPUT | | | | | OUTPUT | | |
|---|---|---|---|---|---|---|---|
| X4 | X3 | X2 | X1 | X0 | Y3 | Y2 | Y1 |
| 0 | 1 | 0 | 0 | 1 | 0 | 1 | 0 |
| 0 | 1 | 0 | 1 | 0 | 0 | 1 | 0 |
| 0 | 1 | 0 | 1 | 1 | 0 | 1 | 1 |
| 0 | 1 | 1 | 0 | 0 | 0 | 1 | 1 |
| 0 | 1 | 1 | 0 | 1 | 1 | 0 | 0 |
| 0 | 1 | 1 | 1 | 0 | 1 | 0 | 0 |
| 0 | 1 | 1 | 1 | 1 | 1 | 0 | 1 |
| 1 | 0 | 0 | 0 | 0 | 0 | 1 | 0 |
| 1 | 0 | 0 | 0 | 1 | 0 | 1 | 1 |
| 1 | 0 | 0 | 1 | 0 | 0 | 1 | 1 |
| 1 | 0 | 0 | 1 | 1 | 1 | 0 | 0 |
| 1 | 0 | 1 | 0 | 0 | 1 | 0 | 0 |
| 1 | 0 | 1 | 0 | 1 | 1 | 0 | 1 |
| 1 | 0 | 1 | 1 | 0 | 1 | 0 | 1 |
| 1 | 0 | 1 | 1 | 1 | 1 | 0 | 1 |
| 1 | 1 | 0 | 0 | 0 | 0 | 1 | 1 |
| 1 | 1 | 0 | 0 | 1 | 1 | 0 | 0 |
| 1 | 1 | 0 | 1 | 0 | 1 | 0 | 0 |
| 1 | 1 | 0 | 1 | 1 | 1 | 0 | 1 |
| 1 | 1 | 1 | 0 | 0 | 1 | 0 | 0 |
| 1 | 1 | 1 | 0 | 1 | 1 | 1 | 0 |
| 1 | 1 | 1 | 1 | 0 | 1 | 1 | 0 |
| 1 | 1 | 1 | 1 | 1 | 1 | 1 | 1 |

As a result of learning the above input and output according to the circuit design method, a multi-layer circuit network of the present invention can be achieved by a three-layer neural network, and each weight value of synapses is obtained as shown in Table 2.

TABLE 2

| no. of layers | INPUT | WEIGHT VALUE |
|---|---|---|
| 0 | 1 | 3   2   3   1   2 |
|   |   | 1   2   0   0  −1 |
|   |   | 0  −1   0   1   1 |
|   | 0 | −3  −2  −3  −1  −2 |
|   |   | −1  −2   0   0   1 |
|   |   | 0   1   0  −1  −1 |
| 1 | 1 | 2   1   1   1   1   3   1   0 |
|   |   | 3   1   3   3   4  −8   1  −3 |
|   |   | 0   2   2  −2  −2  −3   0   7 |
|   | 0 | −2  −1  −1  −1  −1  −3  −1   0 |
|   |   | −3  −1  −3  −3  −4   8  −1   3 |
|   |   | 0  −2  −2   2   2   3   0  −7 |
| 2 | 1 | 1   0   2   1   1   2   0   1   2   0   0 |
|   |   | 1   0   0   1   0  −1   0   0  −1   4   1 |
|   |   | 3   6   6  −2   0  −6   1  11  −6  −5   0 |
|   | 0 | −1   0  −2  −1  −1  −2   0  −1  −2   0   0 |
|   |   | −1   0   0  −1   0   1   0   0   1  −4  −1 |
|   |   | −3  −6  −6   2   0   6  −1  −11   6   5   0 |

<Embodiment II>

A SPIRAL PATTERN RECOGNIZING CIRCUIT

Figure 6A:
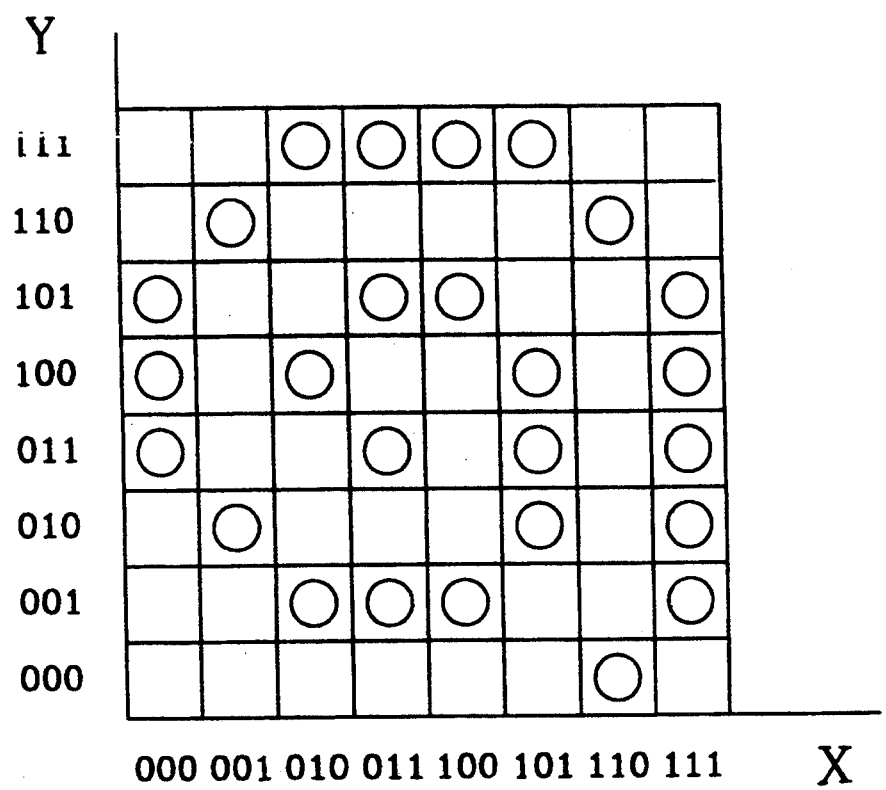
FIG. 6A is a spiral pattern diagram on X-Y coordinates.

A spiral pattern recognizing circuit has a 6-bit input of X-Y plane shown in FIG. 6A, and a single-bit output. As a result of learning the input and output values by the circuit design method of the multilayer neural network of the present invention, the desirable result can be obtained by the nine-layer neural network shown in FIG. 6B-J.

What is claimed is:

1. A MOS multi-layer neutral network receiving an m-bit input and generating an n-bit output, said neural network comprising:

an input layer having m neurons each selectively arranged to receive a corresponding bit value of said m-bit input, each neuron including first and second serially coupled CMOS inverters, an output from each first CMOS inverter being connected to an input of a corresponding second CMOS inverter to generate a non-inverted output therefrom, said output from each first CMOS inverter also providing an inverted output associated with each neuron;

an input synapse group having a plurality of transistor synapse means coupled to respective ones of said inverted and non-inverted outputs from said input layer to form a transistor group matrix, said transistor synapse means generating a plurality of output row bias signals, each transistor synapse means being assigned a predetermined weight value (current driving strength) in relation to its position along the transistor group matrix, each row in the transistor group matrix being responsive to a respective bias signal pre-assigned to provide a select unit weight value bias signal onto said each row and also being responsive to a sum bias signal from each of said transistor synapse means respectively coupled thereto and driven by corresponding ones of said inverted and non-inverted outputs, wherein each row is associated with one of said output row bias signals generated in response to the selected unity weight value bias signal and the respective sum bias signal coupled thereto;

an output layer having n neurons each selectively arranged to output a corresponding bit value of said n-bit output;

at least one hidden layer, each coupled in succession between said input layer and said output layer and including n neurons, wherein a first hidden layer of said at least one hidden layer couples first preselected n output row bias signals from said input synapse group to respective ones of its corresponding n neurons, each said at least one hidden layer being logically coupled to transfer the correspondingly input preselected n output row bias signals to both said output layer and to every subsequent hidden layer coupled thereto in succession; and at least one transfer synapse group, each associated with a corresponding one of said at least one hidden layers and providing respective n first output row bias signals, each transfer synapse group having a plurality of transfer synapse means coupled to corresponding ones of inverted and noninverted outputs from said respective n neurons and further coupled to second preselected n output row bias signals from said input synapse group to form a transfer group matrix for generating said respective first n output row bias signals, each transfer synapse means being assigned a predetermined weight value (current driving strength) as a function of its position along the respective transfer group matrix, wherein each row in a respective transfer group matrix is coupled to each of the n neurons of each successive said at least one transfer synapse group or, if said respective transfer synapse group is the last in succession, then to corresponding inputs of said n neurons of said output layer, and wherein said input synapse group couples a supply voltage to each neuron of said output layer and said at least one hidden layer such that when a corresponding bit value into an input layer neuron is "1", then when a connection weight value is selected to be positive, a first supply voltage is connected with a connection strength of a corresponding connection weight value through a PMOS transistor whose gate is connected to each corresponding inverted output, and when a connection weight value is selected to be negative, a second supply voltage is connected instead through an NMOS transistor whose gate is connected to each corresponding non-inverted output, when a corresponding bit value into said input layer is "0", then when a connection weight value is selected to be positive, a first supply voltage is connected with a connection strength of a corresponding connection weight value through a PMOS transistor whose gate is connected to each corresponding non-inverted output, and when a connection weight value is selected to be negative, a second supply voltage is connected instead through an NMOS transistor whose gate is connected to each corresponding inverted output, and when said input bit value is "1" or "0" and a connection weight value is "0," nothing is connected, and wherein each transfer synapse group is composed of PMOS and NMOS transistors for connecting inverted and noninverted neuron outputs associated therewith.

2. The MOS multi-layer neural network of claim 1, further comprising a bias synapse group for generating the respective bias signals preassigned to each input synapse group row to provide a select unit weight value bias signal, each bias signal being generated by an NMOS transistor whose gate is connected to said first supply voltage.

3. The MOS multi-layer neural network of claim 2, wherein a connection weight value is a function of a geometric aspect ratio of the respective MOS transistor (channel width/channel length).

4. The MOS multi-layer neural network of claim 1, wherein a connection weight value is an integer value.

5. The MOS multi-layer neural network of claim 1, wherein both the sum of connection weight values at each output layer neuron input and the sum of connection weight values at each hidden layer neuron input is smaller than a fan-in value of a preceding stage neuron CMOS inverter.

* * * * *